United States Patent [19]

Kiehs et al.

[11] 3,876,687

[45] Apr. 8, 1975

[54] N-ACYLOXYALKYL-SUBSTITUTED DINITROANILINES

[75] Inventors: Karl Kiehs, Lamperthein; Karl-Heinz Koenig, Frankenthal; Adolf Fischer, Mutterstadt, all of Germany

[73] Assignee: Badische Anilin- & Soda-Fabrik Aktiengesellschaft, Ludwigshafen, Rhine, Germany

[22] Filed: Oct. 13, 1972

[21] Appl. No.: 297,204

Related U.S. Application Data

[62] Division of Ser. No. 170,278, Aug. 9, 1971, Pat. No. 3,770,779.

[30] Foreign Application Priority Data

Sept. 2, 1970 Germany............................ 2043442

[52] U.S. Cl. ................. 260/487; 71/10 G; 260/463; 260/465 D; 260/470; 260/471 C; 260/482 C; 260/490; 260/577
[51] Int. Cl. ............................................. C07c 69/62
[58] Field of Search............................ 260/487, 490

[56] References Cited

UNITED STATES PATENTS 3,332,998   7/1967   Cambie et al...................... 260/573

*Primary Examiner*—Lorraine A. Weinberger
*Assistant Examiner*—Paul J. Killos
*Attorney, Agent, or Firm*—Johnston, Keil, Thompson & Shurtleff

[57] ABSTRACT

New and valuable N-acyloxyalkyl-substituted dinitroanilines having a good herbicidal action and process for controlling the growth of unwanted plants with these compounds.

7 Claims, No Drawings

N-ACYLOXYALKYL-SUBSTITUTED DINITROANILINES

RELATED APPLICATION

This application is a division of our copending application Serial No. 170,278, filed August 9, 1971, now U.S. Pat. No. 3,770,779.

The present invention relates to new and valuable substituted dinitroanilines having a good herbicidal action and the use of these compounds as herbicides.

It is known to use 4-trifluoromethyl-2,6-dinitro-N,N-dipropylaniline as a herbicide. However, its action is not satisfactory.

We have now found that substituted dinitroanilines of the formula

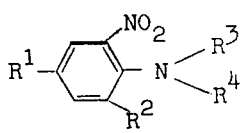

where one of the radicals $R^1$ and $R^2$ denotes nitro and the other denotes methyl, trifluoromethyl or methylsulfonyl, $R^3$ denotes acyloxyethyl or 2-acyloxypropyl (acetyl, propionyl, chloroacetyl, dichloroacetyl, trichloroacetyl, α-chloropropionyl, β-chloropropionyl, chlorocarbonyl, carbomethoxy, or carbethoxy), and $R^4$ has the same meanings as $R^3$ and may additionally denote hydrogen, bromoethyl, alkylthioalkyl (having up to 4 carbon atoms), or linear or branched alkyl, alkenyl or alkynyl each having up to 4 carbon atoms, hydroxyethyl, 2-hydroxypropyl, alkoxyalkyl (methoxyethyl, ethoxyethyl, 2-methoxypropyl, 2-ethoxypropyl), cyanomethyl, cyanoethyl or chloroethyl, having a good herbicidal action.

The action is particularly in evidence on millet species when the compounds are used preemergence and at application rates of 0.5 to 3 kg per hectare. The active ingredients are suitable for controlling unwanted plants in crops such as soya beans, cotton or Indian corn.

The new active ingredients are yellow crystalline substances or non-distillable oils.

The new compounds are produced in accordance with the following equation:

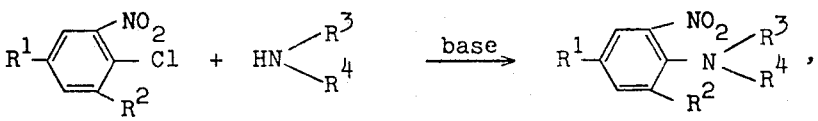

where $R^1$ and $R^2$ have the meanings given above and $R^3$ denotes hydroxyethyl or 2-hydroxypropyl, and $R^4$ denotes the same radicals as $R^3$ and additionally linear or branched alkyl, alkenyl or alkynyl each having up to 4 carbon atoms, alkoxyalkyl, cyanomethyl or cyanoethyl.

The compounds thus obtained may be reacted in conventional manner with halogenating agents ($COCl_2$, $SOCL_2$, $SOBr_2$, $PBr_3$) or acylating agents (acid chlorides, isocyanates) to give the products of the invention.

The suitably substituted secondary amines may also be reached direct to form the products of the invention in accordance with the above equation.

Starting materials and intermediates may be produced for instance by the processes of U.S. Pat. Nos. 2,257,093 and 3,227,734 and in accordance with Journal of the Chemical Society, London, 1949, 190, Suppl.

EXAMPLE 1

N-methylthioethyl-N-hydroxyethyl-2,6-dinitro-4-trifluoromethylaniline:

54 parts (by weight) of 2,6-dinitro-4-trifluoromethyl-chlorobenzene is dissolved in 250 parts of tetrahydrofuran or benzene; subsequently, a mixture of 28.4 parts of N-methylthioethylaminoethanol and 20.2 parts of triethylamine is slowly added, and the whole is stirred for 2 hours at 50° to 60°C. After the triethylammonium hydrochloride has been filtered off, the filtrate is concentrated in vacuo and the residue recrystallized from ethanol. Melting point: 60° to 62°C; yield: 96 percent.

EXAMPLE 2

N-n-butyl-N-(β-chloroacetyloxy-n-propyl)-2,6-dinitro-4-trifluoromethylaniline:

17.5 parts of N-n-butyl-N-β-hydroxy-n-propyl-2,6-dinitro-4-trifluoromethylaniline (m.p. 75° to 77°C; prepared as in Example 1) is dissolved in 50 parts of toluene; 9.0 parts of chloroacetyl chloride is then slowly introduced. The mixture is then first stirred for 12 hours at room temperature, and for a further 3 hours at 40° to 50°C. The filtrated solution is concentrated in vacuo and the residue recrystallized from ethanol/ligroin. Melting point: 84° to 86°C.

EXAMPLE 3

N-methoxyethyl-N-chloroacetyloxyethyl-2,6-dinitro-4-methylaniline:

22.5 parts of N-methoxyethyl-N-hydroxyethyl-2,6-dinitro-4methylaniline (prepared as in Example 1 from 2,6-dinitro-4-methylchlorobenzene and N-methoxyethyl-N-hydroxyethylamine; m.p.: 40° to 42°C) is reacted, as described in Example 4, with 10 parts of chloroacetyl chloride. An oily reaction product is obtained; $n_D^{25} = 1.5400$.

EXAMPLE 4

N-allyl-N-chlorocarbonyloxyethyl-2,6-dinitro-4-trifluoromethylaniline;

67 parts of N-allyl-N-hydroxyethyl-2,6-dinitro-4-trifluoromethylaniline (prepared as in Example 1; $n_D^{25} = 1.5350$) is dissolved in 100 parts of carbon tetrachloride; at room temperature phosgene is passed in, the temperature rising to approximately 40°C. After the reaction has subsided, the mixture is stirred for 30 minutes and subsequently concentrated; the residue is recrystallized from ethanol/ligroin. Melting point: 80° to 82°C.

EXAMPLE 5

Methyl-β-(N-allyl-N-2,6-dinitro-4-trifluoromethylphenyl)-aminoethyl carbonate:

At 10° to 20°C, 5.7 parts of methyl chloroformate is added to a solution of 16.8 parts of N-allyl-N-hydroxyethyl-2,6-dinitro-4-trifluoromethylaniline and 5 parts of triethylamine in 50 parts of chloroform; the mixture is stirred to 2 hours at room temperature and for 1 hour at from 40° to 50°C. The solution is then washed with water and concentrated. A dark oil is obtained. $n_D^{25} = 1.5280$.

The following compounds were prepared in the same way as in these examples:

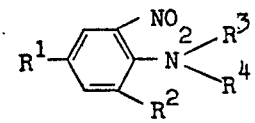

| $R^1$ | $R^2$ | $R^4$ | $R^3$ | |
|---|---|---|---|---|
| $CF_3$ | $NO_2$ | allyl | $CH_2-CH_2-O-COCH_3$ | m.p. 55 to 57°C |
| $CF_3$ | $NO_2$ | $n-C_3H_7$ | $CH_2-CH_2-O-COCH_3$ | $n_D^{25}$ 1.5161 |
| $CH_3SO_2$ | $NO_2$ | $n-C_3H_7$ | $CH_2-CH_2-O-CO-C_2H_5$ | |
| $CF_3$ | $NO_2$ | $n-C_3H_7$ | $CH_2-CH_2-O-CO-C_2H_5$ | |
| $CF_3$ | $NO_2$ | $C_2H_5$ | $CH_2-CH_2-O-CO-CH_2Cl$ | $n_D^{25}$ 1.5225 |
| $CH_3$ | $NO_2$ | $C_2H_5$ | $CH_2-CH_2-O-CO-CH_2Cl$ | |
| $CF_3$ | $NO_2$ | $n-C_3H_7$ | $CH_2-CH_2-O-CO-CH_2Cl$ | $n_D^{25}$ 1.5273 |
| $CH_3SO_2$ | $NO_2$ | $n-C_3H_7$ | $CH_2-CH_2-O-CO-CH_2Cl$ | $n_D^{25}$ 1.5760 |
| $CH_3$ | $NO_2$ | allyl | $CH_2-CH_2-O-CO-CH_2Cl$ | m.p. 60–62°C |
| $CH_3SO_2$ | $NO_2$ | allyl | $CH_2-CH_2-O-CO-CH_2Cl$ | |
| $NO_2$ | $CF_3$ | allyl | $CH_2-CH_2-O-CO-CH_2Cl$ | |
| $CF_3$ | $NO_2$ | allyl | $CH_2-CH_2-O-CO-CH_2Cl$ | $n_D^{25}$ 1.5323 |
| $CF_3$ | $NO_2$ | $CH_2-CH_2-O-COCH_3$ | H | |
| $CF_3$ | $NO_2$ | $CH_2-CH_2-O-CO-CH_2Cl$ | H | m.p. 87–88°C |
| $CF_3$ | $NO_2$ | $CH_2-CH_2-O-CO-C_2H_5$ | H | |
| $CH_3SO_2$ | $NO_2$ | $CH_2-CH(CH_3)OCOCH_2Cl$ | H | |
| $CH_3SO_2$ | $NO_2$ | $CH_2-CH(CH_3)O-COC_2H_5$ | H | |
| $CH_3SO_2$ | $NO_2$ | $CH_2-CH_2-O-COCH_3$ | H | |
| $CH_3SO_2$ | $NO_2$ | $CH_2-CH_2-O-COCH_2Cl$ | H | |
| $CF_3$ | $NO_2$ | $CH_2-CH_2-O-CO-CH_2Cl$ | H | |
| $CF_3$ | $NO_2$ | $CH_2-CH_2-O-COOC_2H_5$ | H | |
| $CF_3$ | $NO_2$ | $CH_3-CH(CH_3)-OCOCH_2Cl$ | H | |
| $CF_3$ | $NO_2$ | $CH_2-CH_2-OCH_3$ | $CH_2-CH_2-O-CO-CH_2Cl$ | $n_D^{25}$ 1.5220 |
| $CH_3SO_2$ | $NO_2$ | $CH_2-CH_2-OCH_3$ | $CH_2-CH_2-O-CO-CH_2Cl$ | |
| $CF_3$ | $NO_2$ | $CH_2-CH_2-O-COCH_2Cl$ | $CH_2-CH_2-O-CO-CH_2Cl$ | m.p. 75–77°C |
| $CH_3SO_2$ | $NO_2$ | $CH_2-CH_2-O-COCH_2Cl$ | $CH_2-CH_2-O-CO-CH_2Cl$ | |
| $CF_3$ | $NO_2$ | allyl | $CH_2-CH_2-O-COCH_2Cl$ | $n_D^{25}$ 1.5303 |
| $CH_3SO_2$ | $NO_2$ | $n-C_3H_7$ | $CH_2-CH_2-O-COCH_2Cl$ | |
| $CF_3$ | $NO_2$ | $n-C_3H_7$ | $CH_2-CH_2-O-COCH_2Cl$ | |
| $CF_3$ | $NO_2$ | $C_2H_5$ | $CH_2-CH_2-O-COCH_3$ | |
| $CF_3$ | $NO_2$ | $CH_2-CH_2-S-CH_3$ | $CH_2-CH_2-O-COCH_2Cl$ | m.p. 70–72°C |
| $CH_3SO_2$ | $NO_2$ | $CH_2-CH_2-O-CH_3$ | $CH_2-CH_2-O-COCH_2Cl$ | |
| $CF_3$ | $NO_2$ | $n-C_3H_7$ | $CH_2-CH_2-O-COOCH_3$ | |

| R¹ | R² | R⁴ | R³ | |
|---|---|---|---|---|
| $CF_3$ | $NO_2$ | n—$C_3H_7$ | $CH_2$—CH-$_2$—O—$COOC_2H_5$ | |
| $CH_3SO_2$ | $NO_2$ | n—$C_3H_7$ | $CH_2$—CH-$_2$—O—$COOCH_3$ | |
| $CH_3$ | $NO_2$ | n—$C_3H_7$ | $CH_2$—CH-$_2$—O—$COOCH_3$ | |
| $CH_3$ | $NO_2$ | $CH_2$—$CH_2$—CN | $CH_2$—CH-$_2$—O—$COOCH_3$ | |
| $CF_3$ | $NO_2$ | $CH_2$—$CH_2$—CN | $CH_2$—CH-$_2$—O—$COOCH_3$ | |
| $CF_3$ | $NO_2$ | $CH_2$—$CH_2$—O—$COOCH_3$ | $CH_2$—CH-$_2$—O—$COOCH_3$ | |
| $CH_3SO_2$ | $NO_2$ | $CH_2$—$CH_2$—O—$COOCH_3$ | $CH_2$—CH-$_2$—O—$COOCH_3$ | |
| $CH_3$ | $NO_2$ | $CH_2$—$CH_2$—$COOCH_3$ | $CH_2$—CH-$_2$—O—$COOCH_3$ | |
| $CF_3$ | $NO_2$ | $CH_2$—CH—O—$COCH_2Cl$ $CH_3$ | n—$C_3H_7$ | |
| $CH_3$ | $NO_2$ | $CH_2$—$CH_2$—O—$COCH_2Cl$ | n—$C_3H_7$ | $n_D^{25}$ 1.5360 |

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling points higher than 150°C, e.g. tetrahydronaphthalene or alkylated naphthalenes, or organic liquids having boiling points higher than 150°C and having one or more than one functional group, e.g. the keto group, the ether group, the ester or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. kieselguhr, talc, clay or fertilizers.

The following experiments demonstrate the biological action of the new compounds.

EXAMPLE 6

In a greenhouse, loamy sandy soil was filled into pots and sown with *Zea mays, Gossypium hirsutum, Soja hispida, Poa trivialis, Lolium multiflorum, Echinochloa crus-galli, Digitaria sanguinalis* and *Setaria spec.*

The soil was then treated with 3 kg per hectare of each of the following active ingredients, each amount being dispersed in 500 liters of water per hectare:

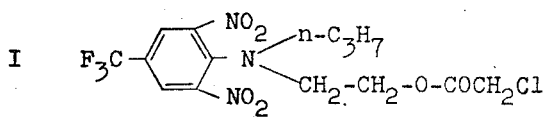

II  N-β-(methylcarbamoyloxy)-ethyl-2,6-dinitro-4-trifluoromethylaniline

III  N-β-(chloroacetoxy)-ethyl-2,6-dinitro-4-trifluoromethylaniline

IV  N,N-bis-[β-γ-(chloroacetoxy)-ethyl]-2,6-dinitro-4-trifluoromethylaniline and, for comparison, V  4-trifluoromethyl-2,6-dinitro-N,N-dipropylaniline.

After 3 weeks, I, II, III and IV had, compared with V, superior compatibility with the crop plants combined with a good herbicidal action.

Active ingredient

| | I | II | III | IV | V |
|---|---|---|---|---|---|
| Crop plants | | | | | |
| *Zea mays* | 0 | 0 | 0 | 0 | 35 |
| *Gossypium hirsutum* | 0 | 0 | 0 | 0 | 5 |
| *Soja hispida* | 0 | 0 | 0 | 0 | 30 |
| Unwanted plants | | | | | |
| *Poa trivialis* | 95 | 80 | 75 | 75 | 95 |
| *Lolium multiflorum* | 90 | 75 | 70 | 70 | 90 |
| *Echinochloa crus-galli* | 90 | 80 | 75 | 75 | 95 |
| *Digitaria sanguinalis* | 85 | 75 | 70 | 70 | 90 |
| *Setaria spec.* | 80 | 75 | 70 | 70 | 80 |

0 = no damage
100 = complete destruction

The action of the following compounds corresponds to that of I, II and III:
4-methyl-2,6-dinitro-N-n-propyl-N-β-(chloroacetoxy)-ethylaniline;
4-methylsulfonyl-2,6-dinitro-N-n-propyl-N-β-(methoxycarboxy)-ethylaniline;
4-trifluoromethyl-2,6-dinitro-N-propyl-N-β-(chloroacetoxy)-propylaniline;
N-β-methylmercaptoethyl-N-β-(chloroacetoxy)-ethyl-2,6-dinitro-4-trifluoromethylaniline;
N-β-methoxyethyl-N-β-bromoethyl-2,6-dinitro-4-trifluoromethylaniline.

EXAMPLE 7

20 parts by weight of the compound of Example 2 is dissolved in a mixture consisting of 25 parts by weight of cyclohexanol, 65 parts by weight of a mineral oil fraction having a boiling point between 210° and 280°C, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 8

20 parts by weight of the compound of Example 3 is well mixed with 3 parts by weight of the sodium salt of diisobutylnaphthalene-α-sulfonic acid, 17 parts by weight of the sodium salt of a ligninsulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1 percent by weight of the active ingredient.

EXAMPLE 9

3 parts by weight of the compound of Example 4 is intimately mixed with 97 parts by weight of particulate kaolin. A dust is obtained containing 3 percent by weight of the active ingredient.

We claim:

1. A substituted dinitroaniline of the formula

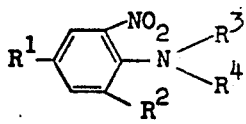

where one of the radicals $R^1$ and $R^2$ denotes nitro and the other denotes methyl, trifluoromethyl or methylsulfonyl, $R^3$ denotes acyloxyethyl or 2-acyloxypropyl wherein the acyl group is acetyl, propionyl, chloroacetyl, dichloroacetyl, trichloroacetyl, α-chloropropionyl, or β-chloropropionyl, and $R^4$ has the same meanings as $R^3$ and may additionally denote hydrogen, bromoethyl, alkylthioalkyl having up to 4 carbon atoms, linear or branched alkyl having up to 4 carbon atoms, linear or branched alkenyl having up to 4 carbon atoms, linear or branched alkynyl having up to 4 carbon atoms, hydroxyethyl, 2-hydroxypropyl, alkoxyalkyl wherein the alkyl groups are lower alkyl, or chloroethyl.

2. 4-trifluoromethyl-2,6-dinitro-N-n-propyl-N-β-chloroacetoxyethylaniline.

3. 4-trifluoromethyl-2,6-dinitro-N,N-bis-(β-chloroacetoxyethyl)-aniline.

4. A substituted dinitroaniline as claimed in claim 1 wherein the acyl group $R^3$ denotes acetyl or propionyl.

5. A substituted dinitroaniline as claimed in claim 1 wherein the acyl group of $R^3$ denotes chloroacetyl, dichloroacetyl, trichloroacetyl, or chloropropionyl.

6. A substituted dinitroaniline as claimed in claim 1 wherein the acyl group of $R^3$ denotes acetyl or propionyl, and $R^4$ denotes hydrogen, linear or branched alkyl having up to four carbon atoms, or allyl.

7. A substituted dinitroaniline as claimed in claim 1 wherein the acyl group of $R^3$ denotes chloroacetyl, dichloroacetyl, trichloroacetyl, or chloropropionyl, and $R^4$ denotes hydrogen, linear or branched alkyl having up to four carbon atoms, allyl, said alkylthioalkyl group, said alkoxyalkyl group, acetoxyethyl or chloroacetoxyethyl.

* * * * *